July 24, 1962 W. J. FAULKNER ET AL 3,046,020
CONTROL MECHANISM FOR PHONOGRAPHS
Filed Dec. 13, 1957 5 Sheets-Sheet 1

INVENTORS.
WILLARD J. FAULKNER.
JACK E. BAYHA.
BY
Lockwood, Galt, Woodard & Smith,
ATTORNEYS.

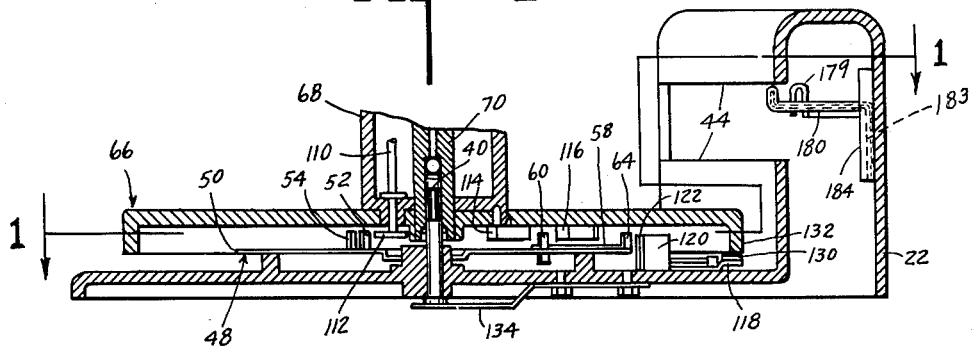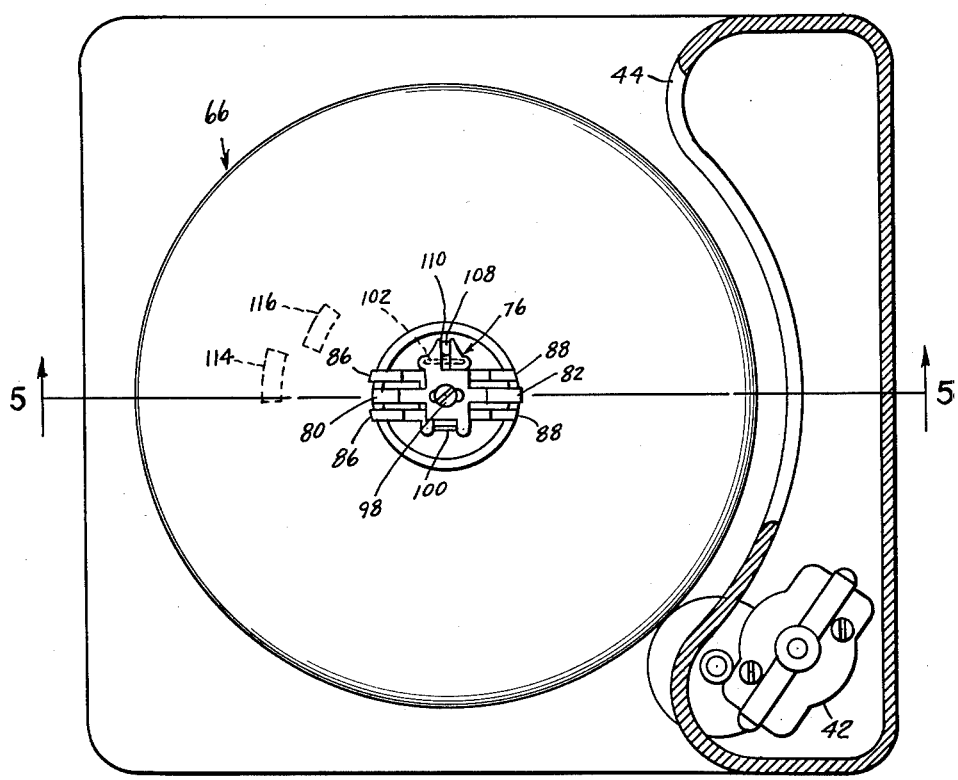

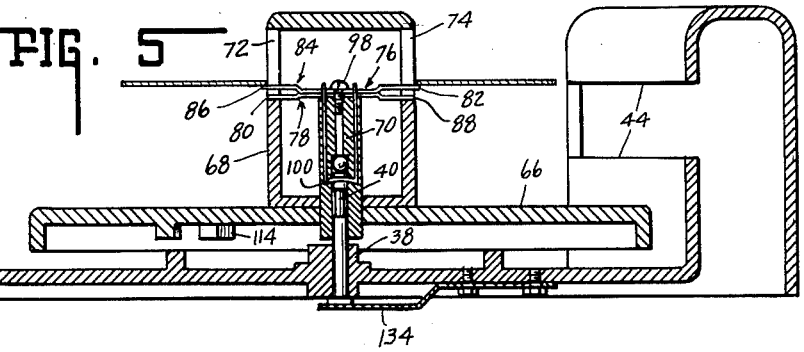
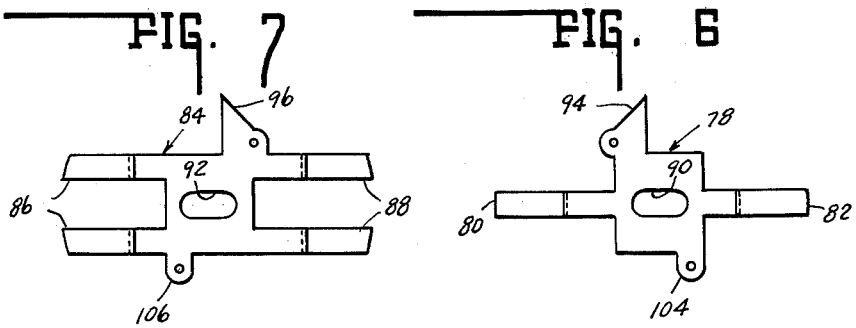
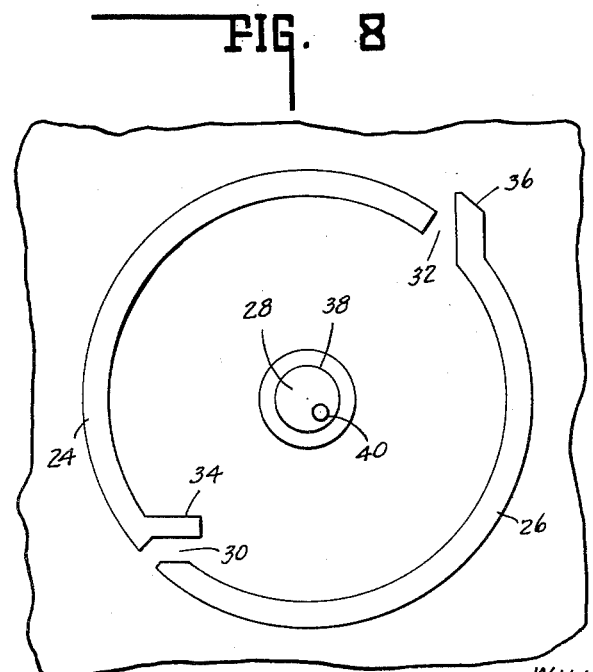

July 24, 1962   W. J. FAULKNER ET AL   3,046,020
CONTROL MECHANISM FOR PHONOGRAPHS
Filed Dec. 13, 1957   5 Sheets-Sheet 4

INVENTORS.
WILLARD J. FAULKNER.
JACK E. BAYHA.
BY
Lockwood, Galt, Woodard & Smith
ATTORNEYS.

INVENTORS.
WILLARD J. FAULKNER.
JACK E. BAYHA.
BY
Lockwood, Galt, Woodard + Smith
ATTORNEYS.

United States Patent Office 3,046,020
Patented July 24, 1962

3,046,020
CONTROL MECHANISM FOR PHONOGRAPHS
Willard J. Faulkner, Coloma, and Jack E. Bayha, Benton Harbor, Mich., assignors to V-M Corporation, Benton Harbor, Mich., a corporation
Filed Dec. 13, 1957, Ser. No. 702,574
7 Claims. (Cl. 274—10)

This invention relates generally to automatic phonographs and more particularly it relates to a record changer having a record handling mechanism and a change-cycle control mechanism of such character that the record changer may be adapted to play one record at a time or to play a plurality of records automatically and successively.

Conventional automatic record changers include record supporting spindles having mechanism adapted to be controlled to drop one record at a time to the turntable, the records having the standard relatively small aperture. In order to adapt such record changers for handling records having relatively large apertures, so-called adapters are mounted over and controlled by the standard spindle whereby the relatively large aperture records may also be dropped one at a time to the turntable. In manufacture of conventional record changers of the type described, it is not possible to convert them to record players which do not operate automatically to change records but which are operated manually to play single records. In other words, major alteration is necessary in the factory in order to eliminate the complex change-cycle control mechanism and substitute a simple record centering spindle.

Accordingly the principal object of this invention is to provide a phonograph having record supporting means and control mechanism of such character that the manufacturer can readily elect during the manufacturing operation to add to or subtract from the basic mechanism of the phonograph those components which are required to produce either an automatic record changer or a simple record player.

It is also characteristic of the conventional automatic record changer to provide a so-called reject button and an automatic shutoff mechanism. The reject button and its associated mechanism operates to initiate operation of the record changer and/or a record changing cycle at the will of the operator. The automatic shutoff mechanism operates automatically to stop the phonograph after all of the records supported on the spindle have been played. These reject devices and automatic shutoff mechanisms are relatively complex and expensive and are not adapted to cooperate with a phonograph of the type defined in the foregoing object of invention.

Accordingly it is another object of this invention to provide a reject mechanism and an automatic shutoff mechanism which may cooperate with an automatic record changer of the type complying with the principal object of this invention.

Another object of this invention is to provide a phonograph having an adapter for permitting the playing of records having a large centering aperture together with an automatic shutoff mechanism wherein the phonograph may be selectively used as a record player for playing one record at a time or as a record changer for playing a number of records in succession.

Still another object of this invention is to provide an automatic shutoff mechanism for record changers which may be mounted in the tone arm of the record changer.

A still further object of this invention is to provide a novel and simplified tone arm control mechanism for automatic record changers.

In accordance with this invention, there is provided a record changer having a relatively short centering spindle for receiving records having a small centering aperture, an adapter which may be mounted on the record changer turntable and over said small spindle for handling records having a relatively large centering aperture, and an automatic shutoff mechanism supported in the tone arm and operable by records supported on said adapter whereby a plurality of records may be played in succession when supported on said adapter or only a single record may be played when no records are supported on said adapter or when said adapter is removed and said record is placed on said relatively small spindle.

In accordance with another feature of this invention there is provided an automatic shutoff mechanism for record changers comprising an electrical switch mounted adjacent the tone arm of the record changer, and a feeler mechanism mounted within the tone arm and operable by records supported above the turntable to provide continuous operation of said record changer and operable in the absence of records supported above the turntable to shut off the record changer mechanism.

In accordance with still another feature of this invention there is provided a tone arm control mechanism for record changers including a spring member operatively associated with said tone arm for moving it from a rest position to a position over the initial playing groove of a record, and a cam and spring mechanism operatively associated with said tone arm and the change-cycle control mechanism for lowering said tone arm into playing engagement with the record and moving said tone arm from its position over the tripping groove of a record back to its rest position beyond the periphery of the record.

The full nature of the invention will be understood from the accompanying drawings and the following description and claims:

FIG. 3 is a cross-sectional illustration of the mechanism of FIG. 1 taken substantially along section line 3—3.

FIG. 4 is a top plan view of the phonograph with certain parts being shown in section.

FIG. 5 is a cross-sectional illustration taken substantially along section line 5—5 of FIG. 4, showing essentially only the turntable construction.

FIGS. 6 and 7 are plan views of the slicer blade construction shown in assembled detail in FIG. 4.

FIG. 8 is a fragmentary plan view of the phonograph base showing the guide rail construction.

Figure 1:
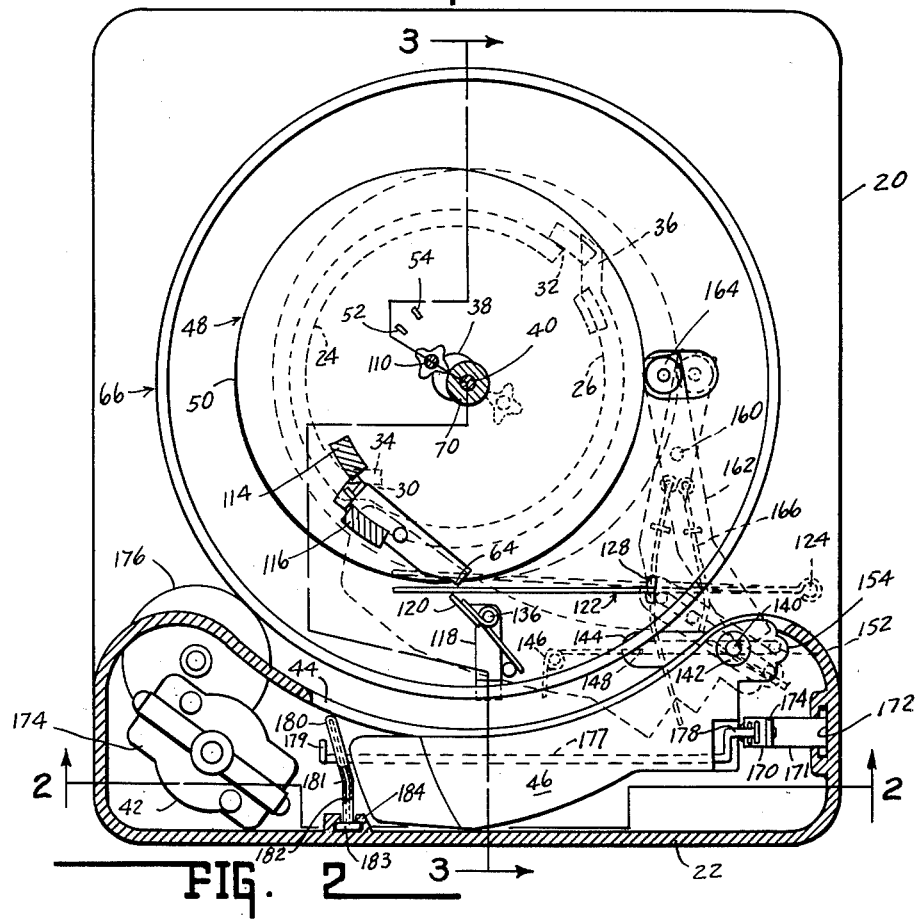
FIG. 1 is a part-sectional illustration, taken on line 1—1 of FIG. 3, in plan view, of a phonograph with portions of the turntable being omitted for purposes of clarity and parts thereof being shown in two different operating positions.

Referring to the drawings, and more particularly to FIGS. 1, 2, 3 and 8, the phonograph of this invention comprises a chassis or base 20 having a motor and tone arm housing 22 on one side thereof. In the central portion of the base, and preferably integral therewith, are two C-shaped guide rails 24 and 26 concentrically arranged about a common center indicated by the reference numeral 28. Two spaces 30 and 32, respectively, are provided between the adjacent ends of the two rails 24 and 26, and because of the particular purpose of these spaces, they will hereinafter be characterized as gates. Extending transversely inwardly from the gate 30 end of the rail 24 is an extension or deflector 34. A like extension or deflector 36 extends radially outwardly from the end of the rail 26 adjacent the gate 32. A pivot post 38 projects upwardly from the base 20 and is concentric about the center 28. A spindle 40 which supports the turntable (to be described later) for rotation is secured in the post 38 in an eccentric position, as is more clearly illustrated in FIG. 8.

Figure 2:
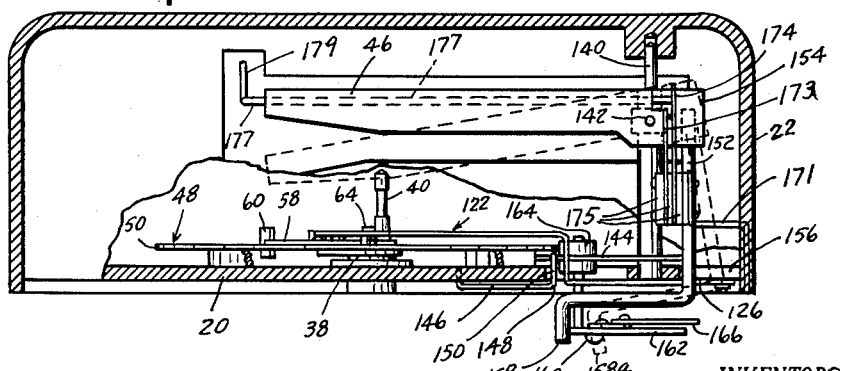
FIG. 2 is a sectional illustration taken substantially along section line 2—2 of FIG. 1, the turntable and drive mechanism being removed for purposes of clarity.

The housing 22 on the base contains therewithin the phonograph motor and turntable drive mechanism, as indicated by the reference numeral 42 (see FIGS. 1 and 4). An opening or window 44 is provided on the inner side of the housing 22 for receiving the phonograph tone arm, as indicated by the reference numeral 46 (FIGS. 1 and 2).

Mounted for rotation on the stationary post 38 is an eccentric cam plate 48, as is best shown in FIGS. 1, 2, 9, 10 and 11. Particularly referring to FIG. 9, the cam plate is essentially a circular sheet metal disc which is eccentric with respect to point 28. Struck upwardly from the cam plate 48 are two arcuately spaced lugs 52 and 54, respectively, which are spaced from the two centers 28 and 40 in a manner which will become apparent from the following description.

Mounted on the cam plate by means of a pivot pin or rivet 56 is a cam-operated lever 58 having a vertically arranged tripping finger 60 on the end thereof which projects above and below the acm plate through an arcuately-shaped slot 62. On the other end of the lever 58 is another tripping finger 64 which projects upwardly. The pivotal connection 56 is sufficiently loose as to allow the lever 58 to swing freely within the limits permitted by the slot 62.

In FIG. 1 the cam plate 48 is shown in two different positions of rotation about the post 38 by the solid and dashed line figures, which are designed by the reference numerals 48 and 48a respectively. It should be understood that the cam plate 48 is freely rotatable on the pivot post 38.

Having now described the base 20, its associated guide rails 24, 26 and the cam plate assembly 48, 58 mounted on the base, the next in order of assembly and logical description is the turntable 66. This turntable is disc-shaped, having an upstanding, tubular post 68 in the center thereof. As will be recognized from the drawings, this post 68 is of the larger diameter type especially adapted for playing the conventional 45 r.p.m. disc-type records.

A suitable bearing 70, which is secured by any suitable means to the turntable 66, rotatably receives the eccentrically positioned spindle 40 for rotatably mounting the turntable on the base 20. In the upper end of the spindle 68 are provided two diametrically opposed windows 72 and 74 which receive for reciprocation therein a set of slicer blades, generally indicated by the reference numeral 76, which is adapted to support a stack of records and drop such records sequentially on the turntable 66. These slicer blades are shown in detail in FIGS. 6 and 7 as comprising one blade 78 having two oppositely extending fingers 80 and 82 and another blade 84 having two pairs of oppositely extending blades 86 and 88. Both blades 78 and 84 are provided with identical slots 90 and 92, respectively.

Blade 78 has a laterally extending ear 94, and blade 84 has a similar but oppositely disposed ear 96. In assembly, the blade 78 is superposed on the blade 84 with the slots 90 and 92 in registry and slidably fitting over a mounting screw 98 which is secured into the upper end of the bearing 70. Both blades are thus free to reciprocate through the windows 72 and 74 to the extent permitted by the respective slots.

Two suitable hairpin springs 100 and 102 are assembled to the slicer blades in such a manner as to urge them inwardly toward the center of the post 68. Spring 100 is fitted to apertured lugs 104 and 106 on the two blades, respectively, while the spring 102 fits into suitable apertures in the two ears 94 and 96 respectively. These springs are preformed so as to urge the two ears 94 and 96 toward each other and into contact with a flatted portion 108 on the spreader shaft 110 (FIGS. 3 and 4) which passes downwardly through the turntable 66 as best seen in FIG. 3. On the lower end of this shaft 110 is fitted a star wheel 112, which will be considered in more detail hereafter.

As will be noted more clearly in FIGS. 4 and 5, the blade fingers 80 and 88, in the non-actuated position, do not project beyond the outer surface of the turntable post 68, while the fingers 82 and 86 do project some distance outwardly beyond this surface.

In operation, a stack of records is placed over the post 68 and onto the projecting ends 82 and 86 of the slicer blade assembly. A record changing cycle is effected by rotating the shaft 110 through 180° in two 90° steps. The first 90° of this rotation results in spreading the ears 94 and 96 which protract the blade tips 80 and 88 and retract the blade tips 82 and 86. This allows the entire stack of records to drop down upon and to thereby be supported by the protracted tips 80 and 88. Through the next 90° of rotation of the shaft 110, the blade tips 82 and 86 are protracted to slice between the lowermost and the next adjacent record on the stack. In order to accomplish this slicing action, it is of course necessary that the superposed blades 80 and 86 as well as the blades 82 and 88 be spaced apart a distance approximately equal to the thickness of a record. Upon retraction of the blade tips 80 and 88, the lowermost record on the stack is dropped onto the turntable and the stack remains supported on the tips 82 and 86.

The accomplishment of this record changing cycle is performed simply by rotating the star wheel 112 through an angle of 180°. The means for rotating this star wheel will be described later.

Figure 9:
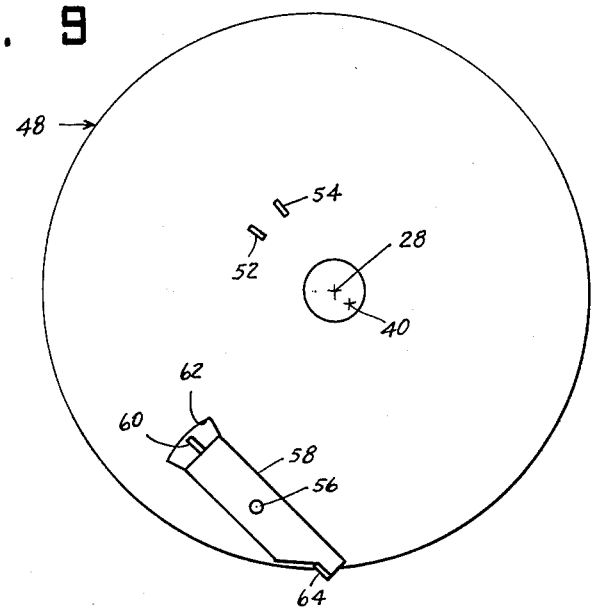
FIG. 9 is a plan view of the cam plate construction.

Continuing with the description of the turntable 66, two pick-up blocks or members 114 and 116 (FIGS. 4 and 5) are fastened to the underside of the turntable in circumferentially and radially spaced relation. Radially, these blocks 114 and 116 are spaced apart a distance substantially equal to the radial thickness of the guide rails 24 and 26. Circumferentially, these blocks are spaced apart a distance slightly greater than the width dimension of the tripping finger 60 (FIGS. 1, 2 and 9).

With the turntable 66 mounted on the spindle 40, the two blocks 114 and 116 will project below the upper end of the tripping finger 60, the purpose of this positioning becoming apparent from the following.

A manual reject-lever 118 is pivotally mounted on the base 20 and is spring biased counterclockwise to retract lever end 120 away from reject link 122 (see FIGS. 1 and 2). Reject link 122 is fastened to a rivet 124 located near the edge of the base 20, as is shown more clearly in FIG. 1. Thus, the link 122 is capable of swinging to a limited extend about this rivet 124 as a center.

The link 122 passes under the base for a distance 126 (FIG. 2), then upwardly through a slot 128 (FIG. 1), and then above the base between the cam plate 148 and the turntable 66. As is best illustrated in FIG. 2, the link 122 is abuttable with the tripping lug 64 on the lever 58. The outer end of the reject lever 118 is provided with a felt pad or the like 130 positioned directly beneath the perimeter 132 (FIG. 3) of the turntable. In normal operation, the turntable 66 is biased upwardly to its illustrated position by means of a bar spring 134 (FIG. 3) which engages the lower end of the spindle 40 for holding the turntable in its upper, running position. However, by pressing downwardly on the top of post 68 with the finger, the turntable may be lowered against the force of the spring 134, thereby bringing the turntable perimeter 132 (FIG. 3) into contact with the felt pad 130 of the reject lever 118. With normal rotation of the turntable 66 being clockwise as viewed in FIG. 1, the reject lever 118 will be pivoted clockwise about its pivot 136 for engaging the end 120 with the reject link 122. The link is thus moved inwardly against the tripping lug 64 on the cam-operating lever 58 which is thereupon swung counterclockwise about its pivot 56.

Just prior to the engagement of the reject link 122 with the lug 64, the lever 58 is resting with the tripping finger 60 disposed inside the gate 30. In other words, the finger 60 is positioned radially between the inner and outer edges of the guide rails 24 and 26. This particular position of the finger 60 is the one in which the phonograph is operating normally in playing a record. Thus, finger 60 assumes this position at all times except during the brief interval of a record changing cycle.

Having now described all of the mechanism needed to produce automatically a record changing cycle, the operation thereof will now be explained.

Figure 10:
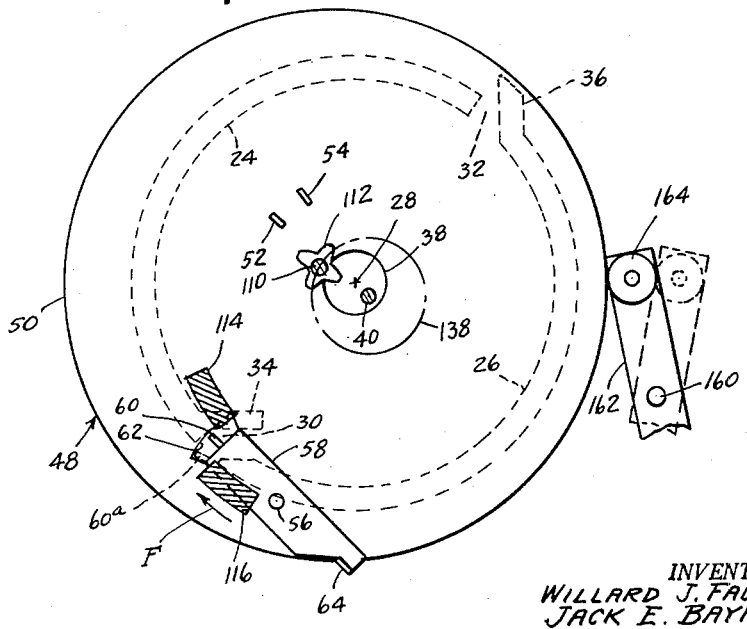
FIGS. 10 and 11 are fragmentary illustrations of portions of the mechanism illustrating the record playing and record changing portions of certain of the operating parts.
Figure 11:
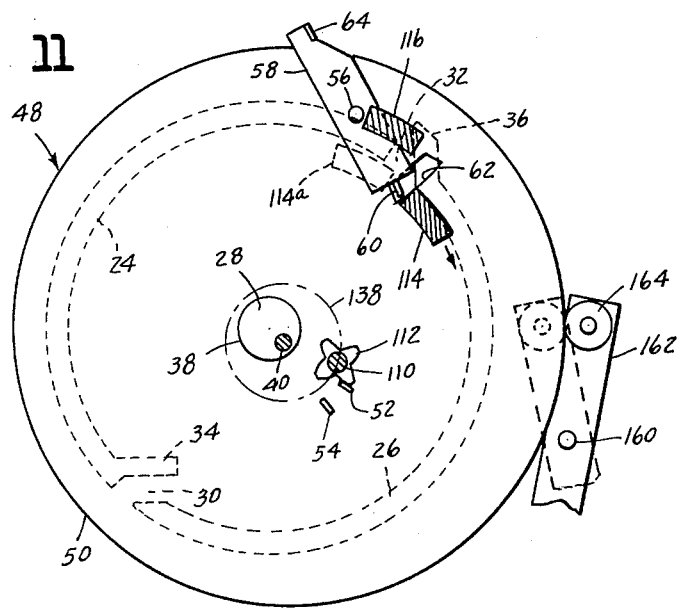

Considering FIGS. 10 and 11 in this explanation along with FIGS. 1 and 2, let it first be assumed that the mechanism is in record playing position, as illustrated in FIG. 10. Upon initiating a record changing cycle by operating the reject lever 118 (FIG. 1), the cam-operating lever 58 is swung counterclockwise, moving the finger 60 out of the gate 30 into the dashed line position indicated by the reference numeral 60a. In this position, the ringer 60, 60a lies in the path of a travelling pick-up block 116 on the turntable, so that rotation of the block in the direction of the arrow F (FIG. 10) results in engagement of the block with the finger. Continued rotation of the block 116 thereby results in rotating the cam plate 48 about its pivot 38. This cam plate rotation continues for approximately one-half revolution until the finger 60 engages the deflector 36. The finger 60 is thereupon guided radially inwardly into the position illustrated in FIG. 11, lying in the path of the pick-up block 114, which, however, at this precise moment, is moving away from the finger. Thus, the engagement between the turntable and the cam plate 48 is broken, and the cam plate no longer moves with the turntable. As the turntable continues rotation, the block 114 will continue its circular movement for one complete revolution until it returns to about the position of FIG. 11 and engages the back side of the finger 60. This particular position of the block 114 is represented by the dashed line representation 114a. The block 114 now carries the cam plate 48 for another one-half revolution until the finger 60 engages the deflector 34, which guides the finger 60 into the gate 30 to the position illustrated in FIG. 10.

The explanation of operation thus far has only considered cam plate 48 rotation during the record changing cycle, so now it is necessary to determine the purpose of this cam plate rotation. As seen in FIG. 10, which is representative of the position of the cam plate 48 during the record playing period, the two lugs 52 and 54 are positioned as shown. Since the star wheel 112 is mounted on the turntable 66, it constantly rotates about the center 40 on the circular path indicated by the reference numeral 138. It will be noted that this circular path 138 is radially inside of the two lugs 52 and 54 whereby the star wheel 112 cannot engage the same. However, during the record changing cycle, the cam plate is rotated during the first half of the record changing cycle, to the position of FIG. 11, thereby positioning the two lugs 52 and 54 in the path of the star wheel 112. Since the pick-up block 114 and star wheel 112 are fastened to the turntable, they will, of course, rotate together. Assuming the position of the block 114 to be that of FIG. 11 during the record changing cycle, the cam plate 48 will remain at rest while the block 114 makes a complete revolution before picking up the finger 60. During this period of relative rotation between the block 114 and finger 60, the star wheel 112 will be carried past the lug 52 which causes 90° rotation of the wheel 112, after which the wheel also engages the lug 54 for producing another 90° rotation. As explained earlier in connection with the slicer blade assembly 76 of FIGS. 4 and 5, a total of 180° of rotation of the star wheel 112 results in dropping the lowermost record of a stack of records onto the turntable.

Recapitulating briefly, during a record changing cycle, the cam plate 48 is turned one-half revolution by the turntable. At the end of this one-half revolution, the engagement between the turntable and the cam plate is broken, whereupon the turntable freely rotates one revolution while the cam plate 48 is at rest. During this one revolution of the turntable, the star wheel 112 is rotated to drop the lowermost record of a stack of records on the turntable post 68. Immediately following the dropping of this record during this single revolution, the turntable picks up the cam plate and returns it to its original position. Thus, the cam plate moves through two distant one-half revolutions for each record changing cycle.

Figure 12:
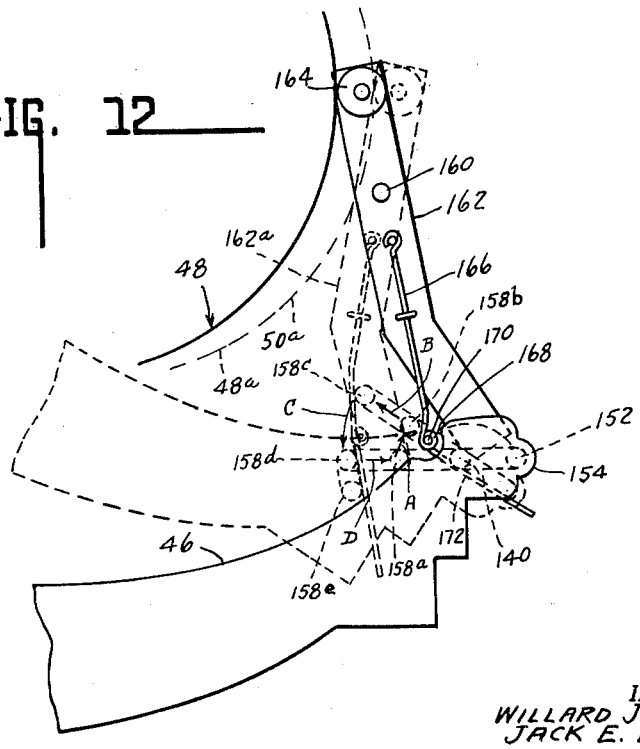
FIG. 12 is an illustration of that portion of the mechanism which directly actuates the tone arm.

The tone arm actuating mechanism is more clearly illustrated in FIGS. 1, 2 and 12, which will now be referred to in detail. The tone arm 46 of conventional construction and which is provided with the usual phonograph needle or transducer is mounted for limited universal movement on a vertical shaft 140 and a horizontal hinge pin 142 which passes through the shaft 140. The shaft 140 is disposed inside the housing 22 so that the tone arm 46 may be completely retracted into the housing or swung outwardly therefrom into record playing position.

On the lower end of the shaft 140 is secured a horizontally extending lever 144 (FIG. 2) which is engageable by a preformed set-down spring 146 which is secured at one end to the base 20. The other end of the spring, indicated by the reference numeral 148, passes upwardly through a clearance opening 150 in the base 20 into abuttable relation with the tone arm lever 144. The spring 146, the clearance aperture 150, and the lever 144 are so related that the spring 146 rotates the lever 144 to a position at which the tone arm will be placed in registry with the lead groove of a record to be played. Thus it is the position of the clearance aperture 150 which determines the set-down position of the tone arm 46.

A crank 152 is secured to the rear end 154 of the tone arm 46 and passes downwardly through an enlarged clearance opening 156 in the base 20. The lower end of the crank is preformed to be essentially parallel with the base when the tone arm 46 is lifted to its illustrated position in FIG. 2, with the left end thereof being bent downwardly as shown in FIG. 2. The tip end of this bent portion is given the reference numeral 158 for use in explaining the operation of this portion of the mechanism.

Since the tone arm 46 is movable vertically about the hinge pin 142, the crank 152 is correspondingly movable as shown in dashed line form (FIG. 2). It will now be apparent that by manipulating the crank arm extremity 158, it is possible to raise and lower the tone arm 46. It will also be apparent that the tone arm can be swung about its pivot post 140 by swinging the crank arm 152. Thus the crank 152 should be considered as the instrument by which the tone arm is moved into and out of record playing position.

Pivotally mounted on the base about a suitable pivot post 160 is a follower arm 162 which carries on one end a roller or cam follower 164 which is engageable with the perimeter of the cam plate 48 and on its other end a tone arm actuating spring 166 which is preformed to the solid line shape as shown in FIG. 12. The actuating spring 166 is so positioned as to be selectively engageable with the crank end 158.

Considering FIG. 12 for the moment, two alternative positions of the follower arm 162 and related mechanism are represented by solid and dashed line figures, respectively, the dashed line figures being designated by the same reference numerals with the suffix "a." With the cam plate in the solid line position 48, the follower arm 162 will assume its solid line position. In the dashed line position of the follower arm 162a, which corresponds to the eccentric position 48a of the cam plate, the spring 166 will be moved into engagement with the crank end 158. It is the movement of the follower arm between the two extreme positions of the follower arm 162 and 162a which results in operation of the tone arm during a record changing cycle, as will be explained in detail.

For automatically shutting off the record changer, there is provided a switch 170 mounted on a bracket 171, suitably fixed to the tone arm housing 22 at 172. Switch 170 comprises a relatively short spring contact 173 and a relatively long spring contact 174 mounted between insulating members 175 in conventional fashion. The spring contact members 173 and 174 extend into alignment with the pivoted end of tone arm 46. A record feeling member 177 in the form of a rod may be rotatably mounted in any suitable manner within tone arm 46. The rod 177 may project outwardly of the pivoted end of tone arm 46 and may be formed to provide a crank 178 which may extend into alignment with the relatively long spring contact 174 of switch 170. The other end of rod 177 may extend outwardly of the free end of tone arm 46 and may be bent to form an upstanding U-shaped finger 179 which may be utilized to sense whether or not there is a record supported on the adapter spindle 68 in position to be dropped to the turntable. In order to reset the feeler rod 177 to a position for sensing a record during each record changing cycle, there is provided a reset member 180 which may be in the form of a wire 181 coated with a relatively thin layer of rubber 182. The reset member 180 includes a supporting portion 183 which may be mounted in a socket 184 attached to or forming a part of tone arm housing 22.

For explanation of operation, it is assumed that the record changer is started by manually rotating the turnable 66 thereby to initiate operation of the reject lever 118 and rotation of cam plate 48. At the start of a record changing cycle, cam plate 48 is in its position 48a and as it moves from this position the follower arm 162 commences to move in a counterclockwise direction. Such movement eases the pressure of spring 166 on the crank end 158 permitting the set-down spring 146 to move crank end 158 and therewith the tone arm inwardly toward the record and position 158d (FIG. 12). As this inward movement starts, the finger 179 (FIGS. 1, 2 and 3) will contact the resetting arm 180 and rotate clockwise to an upward position (looking from the left of FIG. 1). Therefore finger 179 will contact the edge of any record resting on the adapter 68 and will be turned to a horizontal position.

Further counterclockwise movement of lever 162 decreases the pressure of spring 166 on crank end 158 thereby allowing crank end 158 to move from position 158d to position 158a wherein the tone arm will have been lowered into contact with the initial playing groove of the record.

As previously explained, the cam plate 48 assumes the position during record playing as illustrated by the solid line representation 48 of FIG. 1, so that the follower arm 162 (FIG. 12) assumes the position as represented by the solid line representation. As the period of record playing progresses, the tone arm moves inwardly toward the center of the record carrying with it in the direction of arrow "A" of FIG. 12, the crank end 158.

When the tone arm reaches the inner or reject groove of the record, the crank end will reach the position 158b. Simultaneously with reaching this position, the tone arm lever 144 (FIG. 2) engages the vertical portion of the reject link 122, thereby pushing it inwardly into contact with the tripping lug 64 of the cam-operating lever 58. This immediately initiates movement of the cam plate 48 for one-half revolution to the position of 48a as seen in FIG. 12.

In moving to this new position, the follower arm 162 is progressively moved to the dashed line position of 162a, during which movement the portion 168 of the spring engages the crank end 158, moving it in the direction of the arrow "B" to the position 158c. In moving the crank end from the position 158b to 158c, the tone arm is lifted off the record, but just prior to reaching this position 158c, the spring 166 will have bent sufficiently to allow the crank end 158 to pass over the coil 170 of the spring 166, whereupon the portion 172 of the spring will engage the crank end. This will move the crank end in the direction of the arrow "C" from the position 158c to 158e, this movement maintaining the tone arm lifted and also swinging the tone arm back into the housing 22 as shown in FIG. 1. Since the cam plate 48 is held in the position 48a for a short period of time while the record changer drops a new record on the turntable, the tone arm will be maintained retracted inasmuch as the spring 166 holds the crank end in the position 158e.

When the tone arm is swung back into the housing 22, the automatic shutoff mechanism will not be operated due to the fact that finger 179 engaged a record and was turned to a horizontal position thereby rotating the rod 177 and lifting the crank arm 178 to a vertical position such that it will not engage the spring contact 174 to open switch 170. Since switch 170 remains in a closed position, the phonograph will continue to operate. If, on the other hand, finger 179 had not engaged a record, the feeler 177 would have been in the position shown in FIG. 1 whereby crank arm 178 would have engaged the spring 174 to open switch 170 and stop the phonograph. It should be noted that by providing the automatic shutoff mechanism in the tone arm 46, it is possible to operate the automatic record changer of this invention for automatically and successively changing one record after another when the post 68 is mounted on the turntable as already described. If it is desired to manufacture a machine in the nature of a record player where only one record at a time is manually placed on the turntable, the machine may be sold without the post 68 or of course it would be possible for the owner of the machine to remove the post 68 in order to convert the machine to a record player. In this event the automatic shutoff mechanism operates automatically to stop the phonograph after each record is played. Furthermore the reject mechanism and the tone arm control mechanism operate automatically when the turntable is started manually. Accordingly the record player, as contrasted with the record changer, is semi-automatic in its operation in that the machine operates through a complete cycle after it has once been started.

When the record changing cycle has been completed, the cam plate 48 has rotated one-half revolution to the solid line position of FIG. 12, whereupon the follower arm 162 is retracted, i.e., swung counterclockwise to the solid line position, allowing the crank end 158 to swing to position 158d and then to move along the path of the arrow "D" to the starting position 158a. This completes a cycle of playing one record completely and effecting a change of records and starting the playing of a new record.

The phonograph mechanism is powered by means of the driving mechanism 42 comprising an electric motor 174 (FIG. 4) and an idler wheel 176 which engages the outer rim of the turntable 66. In the usual manner, the idler wheel 176 is engaged and rotated by the shaft of the motor 174, so that energization of the motor results in rotation of the turntable. Since the speed of the turntable rotation is critical, it is, of course, necessary that the speed of motor 174 and the size of idler wheel 176 be properly selected for producing the necessary speed of turntable rotation. Since any well known driving mechanism may be used in conjunction with this invention, it is not necessary to describe or discuss further a suitable mechanism.

The invention claimed is:

1. An automatic record changer comprising a turntable having a relatively short centering spindle for receiving records having a relatively small centering aperture, an adaptor mountable on said turntable and over said short spindle for handling a stack of records having a relatively large centering aperture, a tone arm pivotally mounted adjacent said turntable for vertical and horizontal movement to and from positions beneath said stack, an automatic shutoff mechanism supported in said tone arm and comprising an elongated feeler rod mounted on and for rotation within said tone arm and having a looped portion extending from the outer end thereof together with a crank extending from the inner end thereof, a feeler rod adjusting member disposed beyond the periphery of said turntable and in the path of movement of said looped portion for moving said looped portion into the plane of the lowermost record of said stack and a record-feeling position when said tone arm approaches records supported on said adaptor, and a switch member positioned in the path of movement of the crank end of said feeler and responsive to said crank when said feeler remains in the record-feeling position for shutting off said phonograph automatically when said looped portion does not engage a record.

2. An automatic record changer comprising a turntable having a centering means for supporting a stack of records above said turntable, a tone arm pivotally mounted for vertical and horizontal movement adjacent said turntable, an automatic shutoff mechanism supported in said tone arm and comprising an elongated feeler rod mounted for rotation within said tone arm and having a feeler portion extending from the outer end thereof together with a crank extending from the inner end thereof, a feeler-adjusting member disposed beyond the periphery of said turntable and in the path of movement of said feeler portion for moving said feeler portion into a record-feeling position when said tone arm approaches records supported on said centering means, and means including a switch member positioned with respect to the crank end of said feeler rod and responsive to said crank when said feeler remains in the record-feeling position for shutting off said record changer automatically when no record is supported on said centering means.

3. In an automatic record changer having a tone arm pivoted for vertical and horizontal movement and a record playing turntable, an automatic shutoff mechanism supported in said tone arm and comprising an elongated feeler rod mounted for rotation within said tone arm and having a feeler portion extending from the outer end thereof together with a crank extending from the inner end thereof, a feeler adjusting member disposed beyond the periphery of said turntable and in the path of movement of said feeler portion for moving said feeler portion into a record feeling position when said tone arm approaches records supported over said turntable, and means including a switch member positioned with respect to the crank end of said feeler rod and responsive to said crank when said feeler remains in the record-feeling position for shutting off said phonograph.

4. An automatic record changer comprising a turntable mounted for rotational and axial movement and having a relatively short centering spindle for receiving a record, a motor operatively associated with said turntable for rotating it, a change-cycle control mechanism including means driven by said turntable for operating said mechanism through a record changing cycle, a reject mechanism operatively associated with said change cycle control mechanism and disposed relative to said turntable for actuation by axial movement of said turntable for initiating operation of said change-cycle control mechanism, a tone arm mounted for horizontal and vertical movement in operative association with and under the control of said change-cycle control mechanism whereby movement of said turntable in an axial direction initiates movement of said tone arm, a switch electrically connected with said motor and disposed adjacent said tone arm, relatively long auxiliary spindle means mountable over said centering spindle for holding a stack of records and including mechanism operatively associated with said change-cycle control mechanism for dropping one record at a time to said turntable, and feeler means mounted on said tone arm and movable into and out of operative relation with said switch to close said switch subsequent to operation of said reject mechanism whereby said motor drives said turntable through a record playing cycle, said feeler means being disposed on said tone arm in a position to swing with said tone arm into engagement with a record on said auxiliary spindle means and above said short spindle and to be adjusted by said short record into a non-switch operating position whereby a record on said centering spindle cannot set said feeler to a non-switch operating position while a record on said long auxiliary spindle means sets said feeler to a switch inoperative position and said record changer is operative as a single record player or as a record changer.

5. An automatic record changer comprising a turntable having a relatively short centering spindle for receiving a record, a motor operatively associated with said turntable for rotating it, a change-cycle control mechanism including means actuated by said turntable for initiating operation of said mechanism through a record changing cycle, a tone arm mounted for horizontal and vertical movement in operative association with and under the control of said change-cycle control mechanism whereby movement of said turntable initiates movement of said tone arm, a switch electrically connected with said motor and disposed adjacent said tone arm, relatively long auxiliary spindle means mountable over said centering spindle for holding a stack of records and including mechanism operatively associated with said change-cycle control mechanism for dropping one record at a time to said turntable, and feeler means mounted on said tone arm and movable therewith into and out of operative relation with said switch to close said switch during operation of said change-cycle control mechanism whereby said motor drives said turntable through a record playing cycle, said feeler means being disposed on said tone arm in a position to engage with a record on said long auxiliary spindle means and to be adjusted by said record into a non-switch operating position whereby a record on said short centering spindle cannot set said feeler to a non-switch operating position while a record dropping from said auxiliary spindle means sets said feeler to a switch inoperative position and said record changer is operative as a single record player or as a record changer.

6. An automatic record changer comprising a turntable having a relatively short centering spindle for receiving a record, a motor operatively associated with said turntable for rotating it, a tone arm mounted for horizontal and vertical movement adjacent said turntable, a tone arm control mechanism including means driven by said turntable for operating said tone arm toward and away from a record, a reject mechanism operatively associated with said tone arm control mechanism and disposed relative to said turntable for actuation by axial movement of said turntable for initiating operation of said tone arm control mechanism whereby movement of said turntable in an axial direction initiates movement of said tone arm, a switch electrically connected with said motor and disposed adjacent said tone arm, relatively long auxiliary spindle means mountable over said centering spindle for holding a stack of records and including mechanism operatively associated with said tone-arm control mechanism for dropping one record at a time to said turntable, and feeler means mounted on said tone arm and movable therewith into and out of operative relation with said switch to close said switch subsequent to operation of said reject mechanism whereby said motor drives said turntable through a record playing cycle, said feeler means being disposed on said tone arm in a position to engage with a record on said auxiliary spindle means and to be adjusted by said record into a non-switch operating position.

7. An automatic record changer comprising a turntable having a centering means for supporting a stack of records above said turntable, a tone arm pivotally mounted for vertical and horizontal movement adjacent said turntable, and an automatic shutoff mechanism supported in said tone arm and comprising a feeler member mounted within said tone arm and having a portion extending from one end thereof for feeling records supported on said centering means, and means including a switch member positioned with respect to said feeler member positioned with respect to said feeler member and responsive thereto for shutting off said record changer automatically when no record is supported on said centering means.

References Cited in the file of this patent

UNITED STATES PATENTS

| | | |
|---|---|---|
| 1,568,130 | Blackwell | Jan. 5, 1926 |
| 2,509,811 | Dale | May 30, 1950 |
| 2,545,643 | Bender | Mar. 20, 1951 |
| 2,643,129 | Habegger | June 23, 1953 |
| 2,682,412 | Carlson | June 29, 1954 |
| 2,786,685 | Schweitzer | Mar. 26, 1957 |
| 2,873,977 | Manning | Feb. 17, 1959 |
| 2,919,924 | Wilton | Jan. 5, 1960 |

FOREIGN PATENTS

| | | |
|---|---|---|
| 477,325 | Great Britain | Dec. 24, 1937 |
| 757,303 | Great Britain | Sept. 19, 1956 |